United States Patent [19]
Vetter

[11] Patent Number: 5,774,936
[45] Date of Patent: Jul. 7, 1998

[54] ROLLER, IN PARTICULAR A CASTOR

[75] Inventor: Klaus Vetter, Bergisch Gladbach, Germany

[73] Assignee: Tente-Rollen GmBH & Co., Wermelskirchen, Germany

[21] Appl. No.: 727,523

[22] PCT Filed: Mar. 14, 1995

[86] PCT No.: PCT/EP95/00940

§ 371 Date: Oct. 29, 1996

§ 102(e) Date: Oct. 29, 1996

[87] PCT Pub. No.: WO95/28293

PCT Pub. Date: Oct. 26, 1995

[30] Foreign Application Priority Data

Apr. 13, 1994 [DE] Germany .......................... 44 12 603.4

[51] Int. Cl.⁶ .......................................................... B60B 33/00
[52] U.S. Cl. .......................................................... 16/35 R
[58] Field of Search ............................... 16/35 R, 35 D, 16/38, 43

[56]  References Cited

U.S. PATENT DOCUMENTS

| 3,988,800 | 11/1976 | Sachser | 16/35 R |
| 4,815,161 | 3/1989 | Timmer et al. | 16/35 R |
| 5,377,372 | 1/1995 | Rudolf et al. | 16/35 R |

FOREIGN PATENT DOCUMENTS

| 0283057 | 9/1988 | European Pat. Off. | |
| 2683770 | 5/1993 | France . | |
| 6614372 | 1/1970 | Germany . | |
| 2347900 | 4/1974 | Germany | 16/35 R |
| 2520097 | 11/1976 | Germany | 16/35 R |
| 2721375 | 11/1978 | Germany . | |
| 9307665 | 7/1993 | Germany . | |
| 135303 | 7/1985 | Japan | 16/35 R |
| 1367649 | 9/1974 | United Kingdom | 16/35 R |
| 2079848 | 3/1987 | United Kingdom . | |

*Primary Examiner*—Chuck Mah
*Attorney, Agent, or Firm*—Martin A. Farber

[57]  ABSTRACT

The invention relates to a roller, especially a deflection roller (R), with a fork (2) bearing the tyred running wheel (1) and a braking device (25), at least for the rotary movement of the wheel (1), which has a push-rod (10) which can be moved towards the wheel (1) via an actuating device (1), a braking component (26) pressing into the tire (29) and a power storage spring (F) between the actuating device (11) and the braking device (11), and, in order to provide an easily used, tire saving braking device, proposes that the characteristic/ prestress on the power storage spring (F) be designed in relation to the pressure resistance of the tire (29) in such a way that, in the braking position of the actuating device (11), in relation to the braking component (26), a determined depth of penetration into the tire (29) stopping the rotation of the wheel (1) is maintained and not exceeded.

8 Claims, 6 Drawing Sheets

5,774,936

1

ROLLER, IN PARTICULAR A CASTOR

FIELD AND BACKGROUND OF THE INVENTION

The invention relates to a roller, in particular a castor, having a fork carrying the tired wheel and a braking device at least for the rotational movement of the wheel, which braking device has a push-rod displaceable towards the wheel by means of an actuating device, a braking member pressing into the tire, and an energy storage spring interposed between actuating device and braking member.

This type of roller is known from DE-GM 93 07 665. The construction in question seeks to achieve an ABS-style braking system. The aim is therefore to exert a highest possible braking force on the wheel in such a way that blocking just about occurs, while continuing to maintain the wheel slip. Any additional force is diverted into the roller parts. A component of the device in question is a push-rod, displaceable by external force, which has an energy storage spring interposed between an actuating device and braking member or which is itself set up as a push-rod resilient in itself. The braking member, which is pivotally mounted as a double-armed lever in the base of the fork, is provided with an additional spring for the lifting of the braking component. The push-rod is inserted freely from above into the corresponding receiving portion of the roller.

SUMMARY OF THE INVENTION

In view of the above, it is an object of the present invention to providing a roller of this kind in a manner which is more advantageous in use, while achieving a braking device which is less severe on tires.

As a result of the invention, a roller of this kind with increased utility value is achieved: for example, the rapid wear to be observed in the event of unsuitable tolerance pairings and/or incorrect mounting of the wheel may be substantially minimised. In practical terms, it is provided that the characteristic/prestress of the energy storage spring in relation to the pressure resistance of the tire is arranged so that when the actuating device is in the braking position, the braking member maintains but does not exceed a depth of penetration into the tire specified for stopping the rotation of the wheel. Under the normal force conditions, the push-rod operates like a rigid push-rod; it is only in the event of higher braking-related resistance that the desired overload safety arrangement takes effect. The strength of the relatively hard energy storage spring, which by far exceeds the effect of a restoring spring, thereby neutralises a part of the length of the push-rod stroke as set-up, precisely to the extent to prevent damage. In the long term, this brings about a substantial saving of the tire and keeps the actuating forces to be applied within the normal range. Furthermore, it is advantageous from a construction viewpoint for the energy storage spring to be disposed between an externally-controlled plate of the actuating device and a spring-biased slide member, which engages in the energy storage spring and is biased by a second spring in the direction of the plate, which slide member is positioned at the one end of the push-rod. Plate and slide member thus form the support for the energy storage spring, the two-part arrangement being further utilised so that plate and slide member engage against one another before the energy storage spring bottoms, i.e. the turns of the spring close up. This enables exact consideration of the free space required for the respective type and size of roller. For this, an arbor portion of the plate engages in addition into a passage of the slide device.

2

This provide a non-tilting abutment for both of the ends of the energy storage spring. This construction may also be further used to the effect that slide member and arbor portion of the plate are coupled positively in one another. A precise determination of the stop-limited spring path may thereby be achieved by simple means in that the positive coupling is formed by the head of a screw, whose screw-bolt side external edge engages against a shoulder in the passage of the slide member. Finally, it also proves to be advantageous for the braking member to be arranged to be adjustable in height relative to the push-rod at the other end of the push-rod. In this way, the initial adjustment and any subsequent adjustment which may become necessary as a result of wear may be achieved by the simplest possible means.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

The depicted castor R may be associated with hospital beds, which, for example, have a central control device, by means of which blocking of the rolling movability of the wheel 1 and/or the pivoting movability of a fork 2 may be selectively effected. Otherwise, there suffices an individual actuation in this connection of the castors R using a control lever 3, which may be connected to the control lever of a neighbouring castor by means of a transverse rod.

Figure 1:
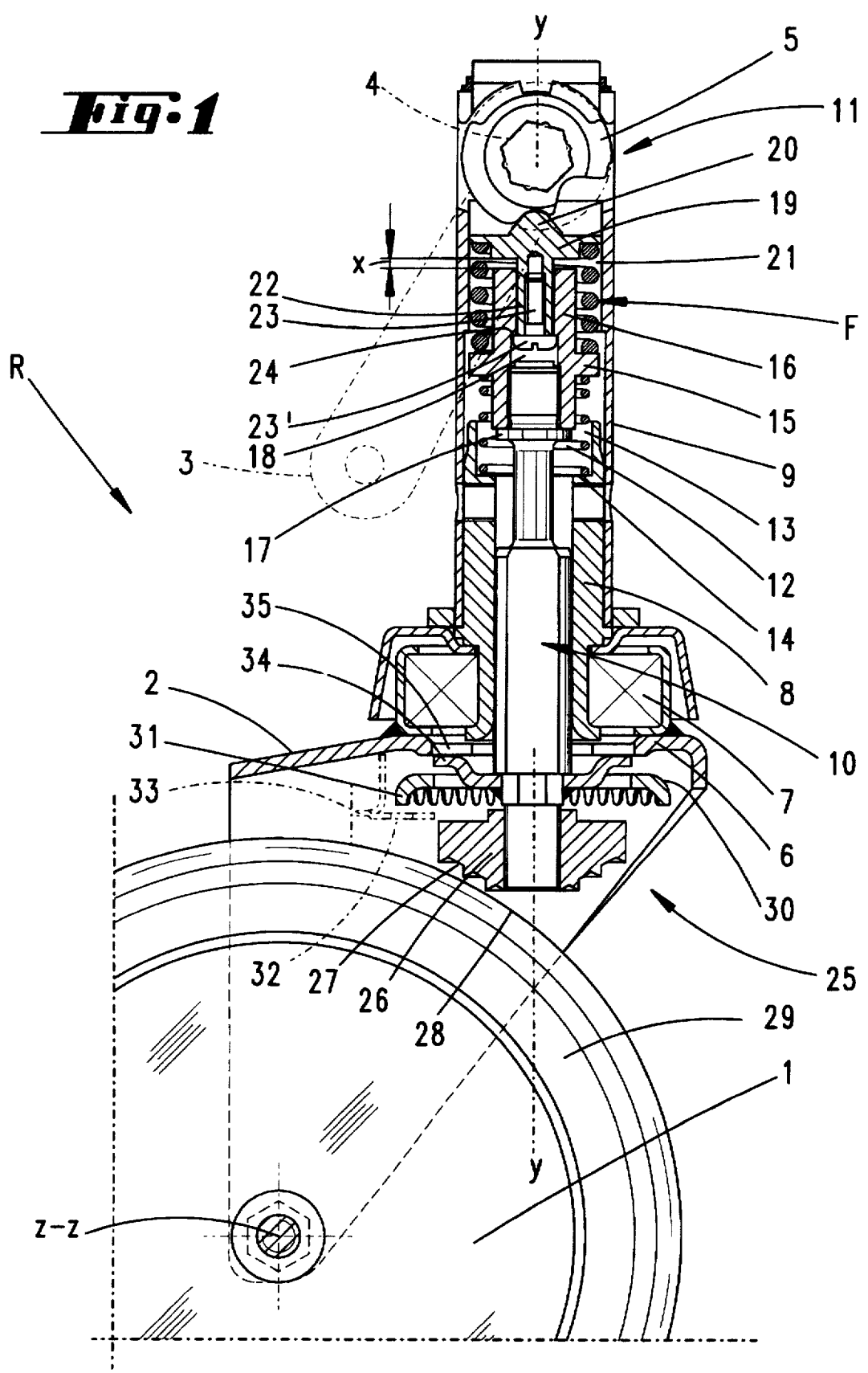
FIG. 1 shows in vertical cross-section, a roller in the form of a castor, with roll and deflection released.
Figure 2:
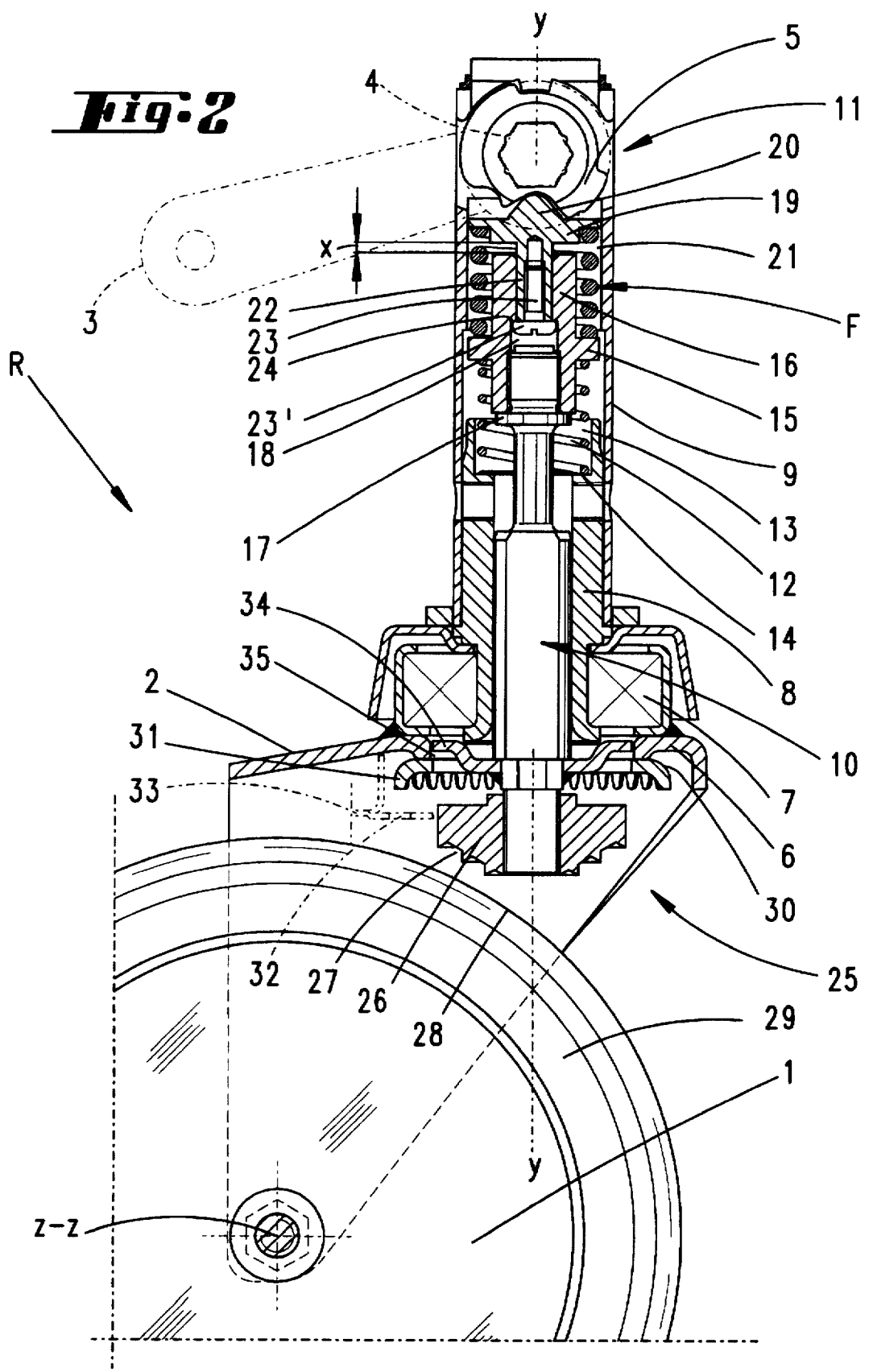
FIG. 2 shows the same cross section with deflection blocked.
Figure 3:
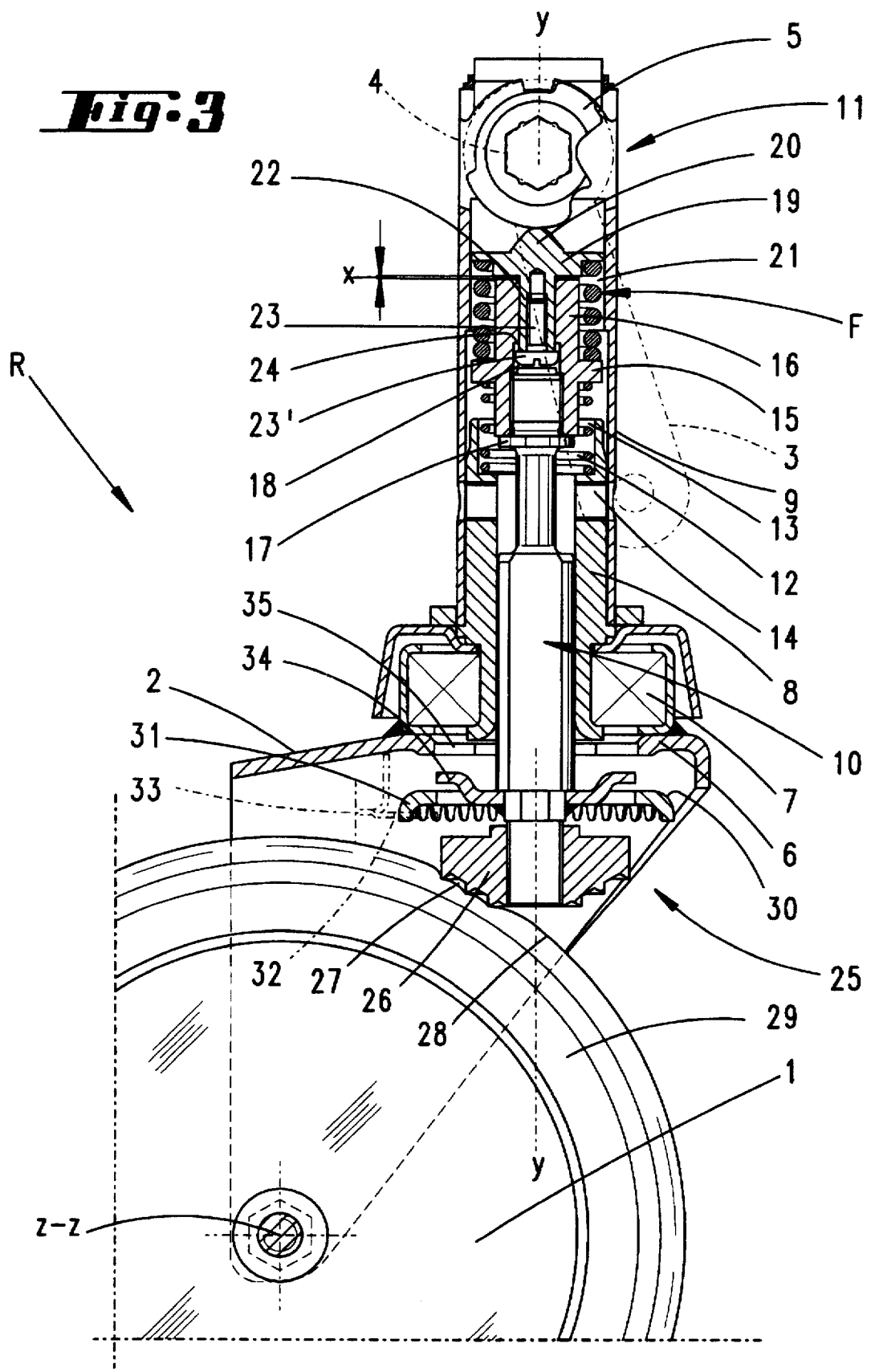
FIG. 3 shows a similar cross-section with the wheel in braking position and deflection blocked (this basic construction carries a control cam at the top, which can be operated either by an actuating lever or by a central control device, not shown)

The control lever 3 actuates a control cam 5, which has a matching hub opening, by means of a polygon section 4, as shown for the basic construction of FIGS. 1 to 3.

From the back of the fork base 6 of the fork 2, there extends a vertically upwardly directed pivot 8, with interposition of a ball bearing 7. The pivot 8 is sheathed by a sleeve 9, which is insertable into a hollow foot of a bed frame or the like and secured therein in conventional manner.

The upper end of the sleeve 9 forms a bearing, aligned transversely to the vertical, for the rotatable control cam 5.

A push-rod 10, which is vertical but secured against rotation, is housed in the interior of the hollow-formed pivot 8. This is moved from the top-side towards the wheel 1 by an actuating device designated in its entirety by reference 11. This takes place against the force of a spring 12, which acts as return spring. The upper end position is to be seen in FIG. 2 and is stop-limited. The spring 12 is shown as screw-adjustable compression spring. The latter projects into a bore 13 at the top. The lower end turn of the spring 12 is supported on the annular shoulder-form base 14 of the bore 13.

The upper end turn of this spring 12 acts against the annular collar 15 of a slide member 16, and more particularly against the underside of the annular collar.

The slide member 16 connects coaxially with the push-rod 10, upwards at the top of the push-rod. It is screwed onto the latter in stop-limited manner. An annular shoulder 17 of the push-rod 10 forms the corresponding limit stop. The portion of the push-rod 10, which extends upwards beyond the annular shoulder 17, has external threading to engage in corresponding internal threading of the slide member 16 which is hollow throughout. The passage therethrough bears the reference numeral 18.

The upper termination of the push-rod 10 is formed by a coaxially mounted plate 19, as a part of the push-rod acting as lateral transfer-function part of the actuating device 11.

As depicted in basic form, FIG. 1, the plate 19 is cam-controlled by the aforementioned control cam 5.

Figure 4:
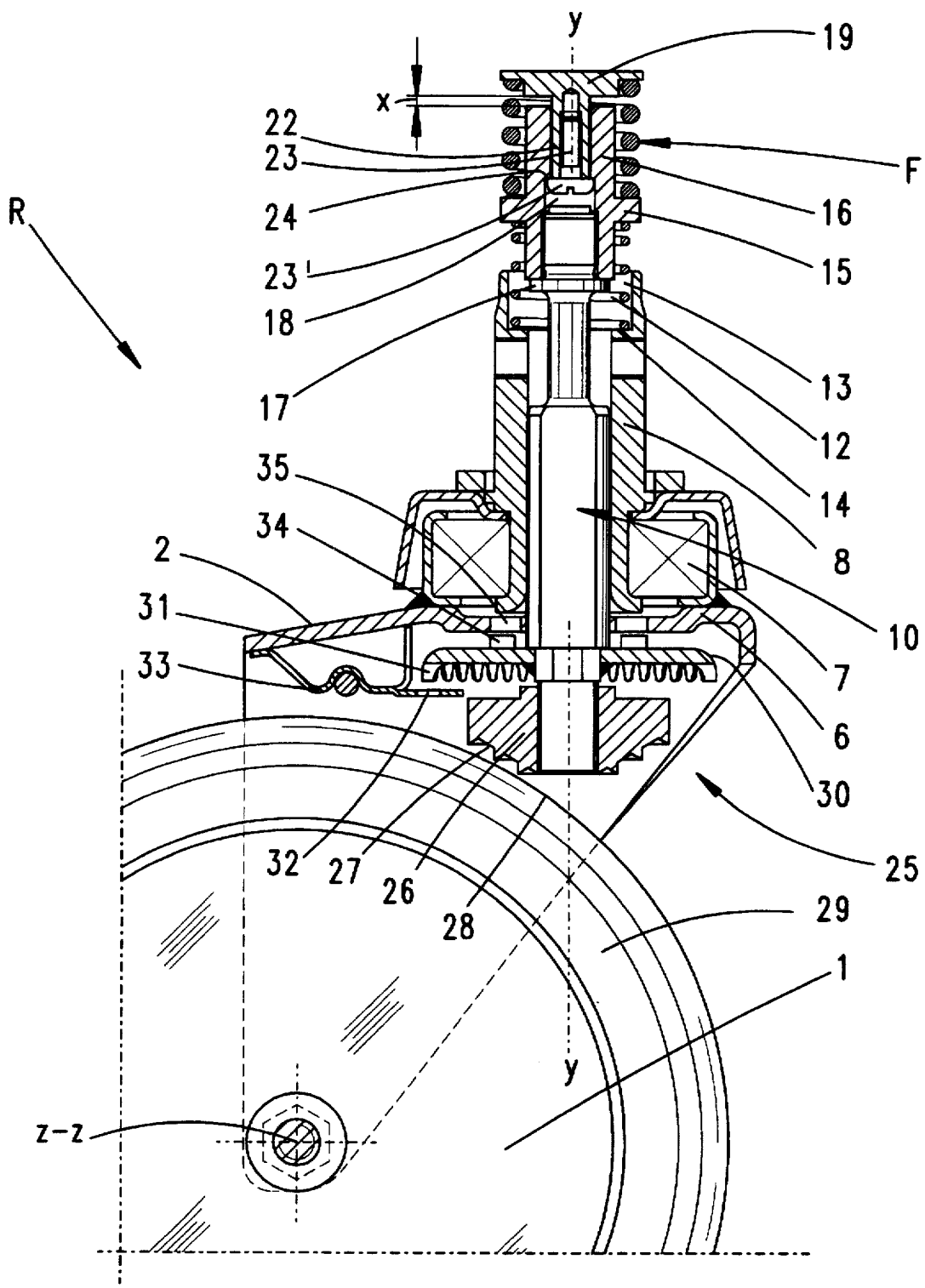
FIG. 4 shows a representation corresponding to FIG. 1 of a second embodiment, once again with roll and deflection released.
Figure 5:
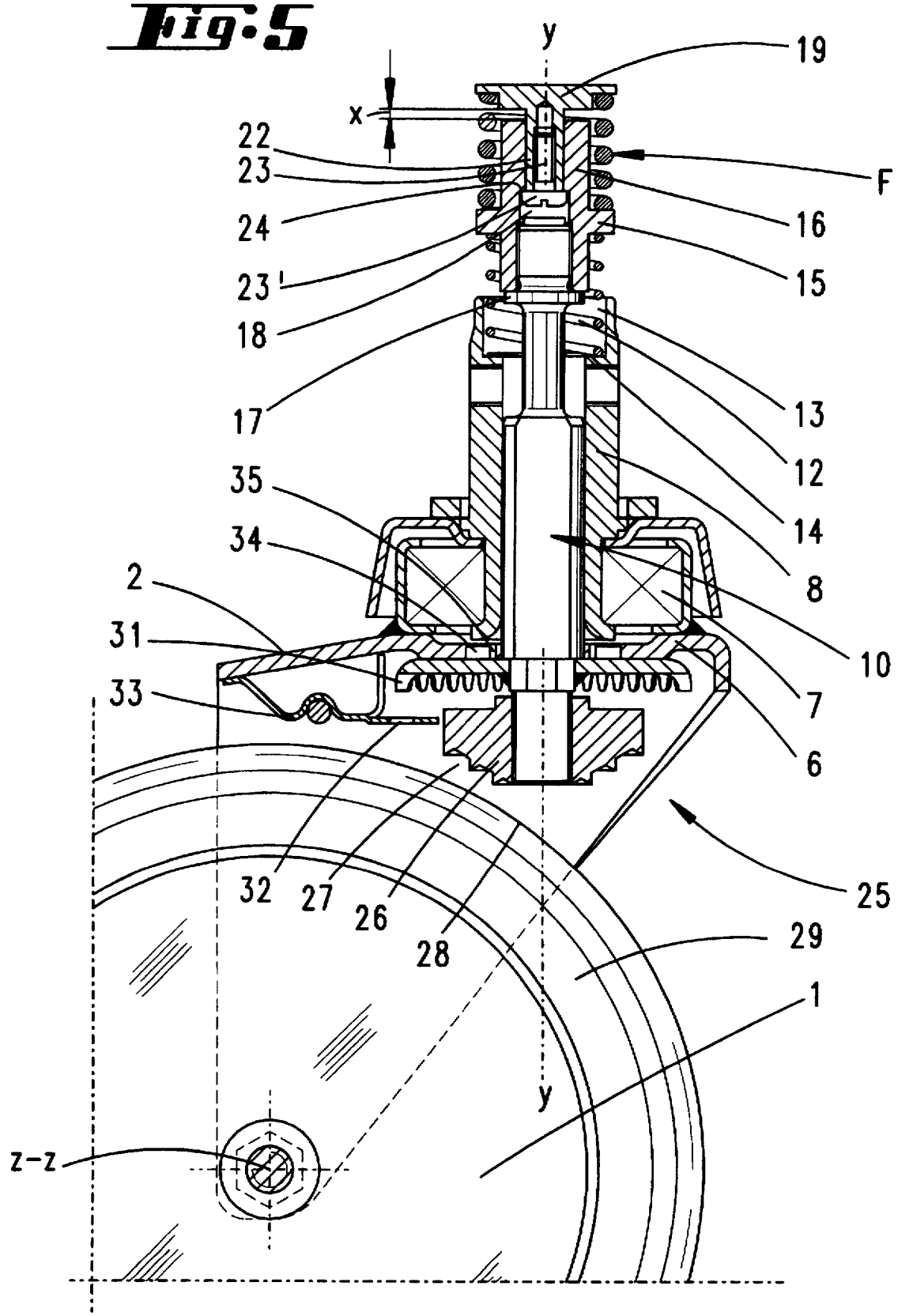
FIG. 5 shows the same section with deflection blocked.

According to the second embodiment, FIG. 4, by contrast, there engages a member of an external control arrangement, not shown, such as for example a Bowden cable, a pressure finger of which acts in a controlled step-lift manner against the upper side of the plate 19.

The cam control provides a tooth 20 on the upper side of the plate 19, which tracks set-backs of differing depth and a circular curve section of the rotatable control cam 5, so that the running movability of the wheel 1 and/or of the pivoting movability of the fork 2 may be brought about by the basic position shown in FIGS. 1 and 4. The basic position and the other positions are defined by the support at the top.

Between the plate 19 of the actuating device 11 and the slide member 16, which is urged by the spring 12 towards the plate 19, there is a energy storage spring F. This shown as a screw-adjustable compression spring. The slide member 16 projects into the interior of the energy storage spring F and thus forms a mount or guide for the cylindrically wound energy storage spring F.

Making further use of the aforementioned annular collar 15, the energy storage spring F is supported by means of its end turn at collar 15 on the upper side of the annular collar 15.

The upper end turn engages underneath the edge of the plate 19. In order to obtain a good centering of the upper turn, the underside of the edge is turned out, so that the base of the plate also projects with a centering effect into the interior of the energy storage spring F, but only to approximately the depth of one turn cross-section of this spring.

The sleeve 9 which is pushed onto and secured to the pivot 8 (omitted in the embodiments of FIG. 4) produces the peripheral end of a holding arrangement or spring chamber 21 formed in this way.

The plate 19 is held in axially limited manner on the slide member 16, to be displaceable but not to be removable (from the slide member). For this purpose, a shaft or arbor portion 22, which extends downwards proceeding centrally from the base of the plate 19, engages in the stepped-formed passage 18 of the slide member 16. Slide member 16 and arbor portion 22 are positively coupled to one another. The positive coupling bringing about the slide limitation is provided by the head 23' of a screw 23. The screw-bolt side external edge of the head 23' abuts against a shoulder 24 in the passage 18 of the slide member 16. The said shoulder is formed by an internal projection caused by differing dimensions of diameter of the passage 18. The plate-side section of the passage 18 is of lesser diameter than the section having the threaded bore. The shoulder 24 is directed downwards.

The arbor portion 22 has a threaded bore for the screw 23, proceeding from the free end of portion 22.

Between the upper face of the slide member 16 and the underside of the plate base of the plate 19, there is left an axial spacing x in the vertical direction. This permits an axial compression, i.e. shortening of the push-rod 10, 19, against the force of the energy storage spring F. The energy storage spring F is set up with a prestress such that before a so-called bottoming of the turns of the energy storage spring F, plate 19 and slide member 16 first of all come into abutment against one another, so that operation can therefore only take place in the resilient region of the spring and bottoming does not occur.

At the lower end of the push-rod 10, there is a braking device designated in its totality as 25. It is arranged at least to stop the rolling motion of the wheel 1. An additional function is the blocking of the pivoting movability of the fork relative to the pivot 8. For this purpose, the ball bearing 7 is interposed, so that the rotary movement of the fork 2 can take place about the vertical longitudinal central axis y-y of the pivot 8. The horizontal geometric axis z-z of the wheel 1 is markedly displaced to the side of the vertical longitudinal central axis y-y.

A braking member 26, positioned at the lower end of the push-rod 10, serves to stop the wheel 1. It is disposed in a height-adjustable manner at a lower portion of the push-rod 10, which lower portion has a corresponding thread, so that its roughened braking surface 27 can be brought precisely to the operationally-correct basic position for a circular tread 28 of an elastic tire 29 of the wheel 1. As the braking direction is to the side of the uppermost point of the tire 29, the braking member 26 is in the shape of a truncated cone, so that as a result of its rotationally symmetrical braking surface 27, the same conditions prevail in every rotational-angular disposition of the braking member 26.

A toothed ring 30, which is installed behind the braking member 26, serves to block the pivoting movability of the fork 2. The toothed ring 30 positioned in non-rotatable manner on the vertically displaceable push-rod 10. Its downwardly-pointing teeth 31 cooperate with tooth spaces 32 of a resilient blocking member, which enables a resilient urging of the teeth 31 into the spaces. On entering these (32), the pivoting movement of the fork 2 is blocked at the same time as the rotational movement of the wheel 1 is stopped.

On the other hand, it is however also possible to block only the pivoting movement of the fork 2, as there are blocking projections 34 at the top of the toothed ring 30, which can be engaged in matching recesses 35 of the fork base 6. In this situation, the push-rod 10 assumes its highest possible displacement position.

Figure 6:
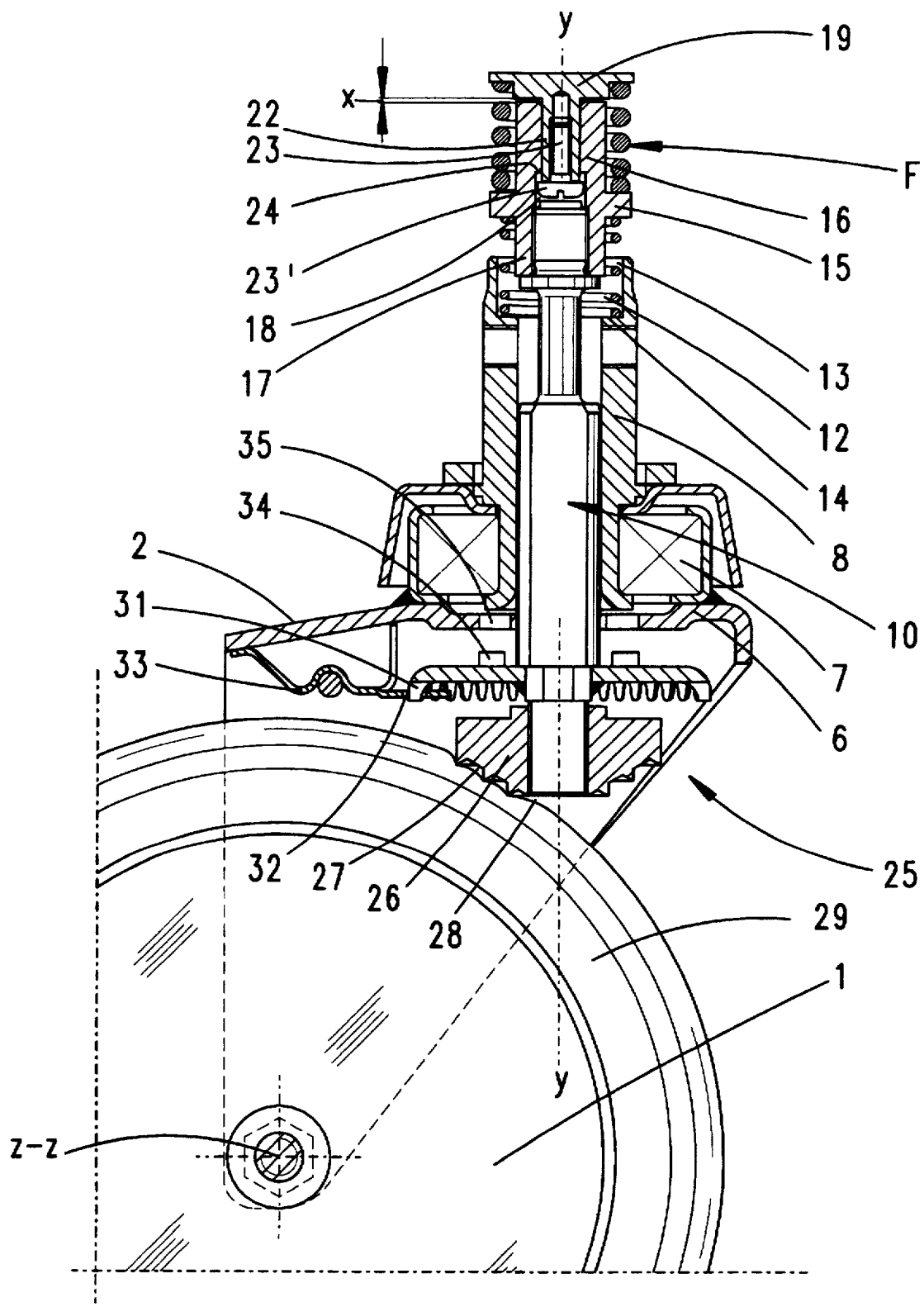
FIG. 6 shows it with the wheel in braking position and with simultaneous blocking of deflection, actuated by a central control device, not shown, (the corresponding total locking is indicated in the basic construction in accordance with FIGS. 1 to 3 by means of chain-dotted lines).

Unnecessarily high levels of stress can be placed on the tread 28, and indeed on the whole tire 29 as a result of wear, unsuitable tolerance pairings, or also incorrect placement of the wheel 1. In order to counteract this effectively and by simple means, the characteristic/prestress of the energy storage spring F, which is formed to be markedly stronger than the spring 12, is set up in relation to the pressure resistance of the tire 29 such that in the braking position (FIGS. 3, 6) of the actuating device 11, the braking member 26 maintains and does not exceed a penetration depth into the tire 29, chosen to stop the rotation of the wheel 1.

In the "loose" condition (see FIGS. 1 and 4), there is for example a gap of approximately 1 mm between the braking member 26 and the tread 28 of the wheel 1. In the "completely fixed" position (see FIGS. 3 and 6), the braking component 26 digs for example approximately 2 mm into the tire 29. For a roller of the type shown, this would require an actuating force of approximately 420 N.

If the roller R, or indeed the wheel 1, is incorrectly set, the braking member 26 must be pressed approximately 3 mm into the tire 26. The force to be applied thus rises to approximately 900 N. In order to reduce this increase in force, the elastic element in the form of the energy storage spring F is interposed. The energy storage spring is for example prestressed to 420 N. If the wheel is incorrectly set, the energy storage spring F is compressed, thus compensating for part of the stroke path of the push-rod 10. Consequently, the braking member 26 is not pressed further into the relatively hard tire 29. The actuating force thus, as has been discovered, only increases by 50 N instead of 480 N.

As an alternative to the arrangement shown, the energy storage spring F may also be installed at another suitable location, for example in the region of the braking member 26, or even in what is called the switch box, in which the control cam 5 is located.

I claim:

1. A roller, in particular a castor (R), comprising a fork carrying a rotatable wheel with a tire and a braking device adapted for braking rotation of the wheel, a push-rod mounted displaceably towards the wheel and including an actuating device enabling displacement of the push-rod towards the wheel, said braking device comprises a braking member mounted on a bottom portion of the push-rod so as to press into the tire upon displacement of said push-rod towards said wheel into a braking position, and an energy storage spring operatively mounted so as to act against said braking member enabling an axial shortening of said push-rod against force of said energy storage spring, and wherein the energy storage spring is prestressed in relation to pressure resistance of the tire such that in the braking position, the braking member maintains, without exceeding, a penetration depth into the tire specified for stopping the rotation of the wheel.

2. A roller, in particularly a castor, comprising
   a fork carrying a rotatable wheel having a tire, and
   a braking device adapted for braking rotation of the rotatable wheel,
   a push-rod mounted displaceably towards the wheel, and including an actuating device for enabling displacing said push-rod towards said wheel,
   said braking device has a braking member mounted on said push-rod and adapted to press into the tire upon displacement of said push-rod towards said wheel, and
   an energy storage spring operatively interposed with prestressing between said actuating device and said push-rod enabling an axial shortening of the push-rod against force of said energy storage spring, the prestressing of the energy storage spring in relation to pressure resistance of the tire being such that in a wheel braking position of the actuating device, the braking member maintains, without exceeding, a penetration depth into the tire specified for stopping rotation of the wheel.

3. A roller according to claim 2, further comprising
   a spring-biased slide member engages in said energy storage spring, and is connected to said push-rod so as to be an integral part of the latter,
   a second spring,
   said actuating device comprises an externally controlled plate,
   said energy storage spring is disposed between said controlled plate spring-biased slide member, and said slide member is biased by said second spring in a direction toward the plate, and said slide member is located adjacent a top end of the push-rod and is spaced from and under said plate.

4. A roller according to claim 3, wherein said plate and said slide member are displacebly mounted so as to enable engagement with one another in the braking position, said energy storage spring has turns, and the turns of the energy storage spring are spaced apart so as to keep said energy storage spring in a resilient operative condition when said plate and slide member are in engagement with one another.

5. A roller according to claim 3, wherein said plate has an arbor portion extending into a passage in the slide member.

6. A roller according to claim 5, wherein said slide member and said arbor portion of the plate are coupleable to one another.

7. A roller according to claim 6, further comprising a screw having a head, and a downwardly facing shoulder formed in the passage of the slide member, and wherein a releaseable coupling of said plate and said arbor portion is formed by an upwardly facing portion of said head of said screw which engages against said shoulder of the slide member.

8. A roller according to claim 2, wherein the braking member is mounted at a lower end of the push-rod adjustable in height with respect to the latter.

* * * * *